(12) United States Patent
Agrawal et al.

(10) Patent No.: US 10,986,646 B1
(45) Date of Patent: Apr. 20, 2021

(54) SCHEDULING VIRTUAL PREAMBLES FOR DATA SOURCE REPORTING

(71) Applicant: Skylo Technologies, Inc., San Mateo, CA (US)

(72) Inventors: Meghna Agrawal, Cupertino, CA (US); Andrew Nuttall, Mountain View, CA (US)

(73) Assignee: Skylo Technologies, Inc., Palo Alto, CA (US)

( * ) Notice: Subject to any disclaimer, the term of this patent is extended or adjusted under 35 U.S.C. 154(b) by 6 days.

(21) Appl. No.: 16/658,044

(22) Filed: Oct. 19, 2019

(51) Int. Cl.
*H04W 72/12* (2009.01)
*H04W 56/00* (2009.01)
*H04W 72/04* (2009.01)
*H04B 7/185* (2006.01)

(52) U.S. Cl.
CPC .......... *H04W 72/12* (2013.01); *H04B 7/1851* (2013.01); *H04W 56/001* (2013.01); *H04W 72/044* (2013.01); *H04B 7/18539* (2013.01)

(58) Field of Classification Search
CPC ... H04W 72/12; H04W 72/044; H04W 72/04; H04W 72/042; H04W 56/00; H04W 56/001; H04W 56/0035; H04W 56/0055; H04B 7/18; H04B 7/185; H04B 7/1851; H04B 7/18517; H04B 7/18523; H04B 7/18526; H04B 7/18539
See application file for complete search history.

(56) References Cited

U.S. PATENT DOCUMENTS

| | | | |
|---|---|---|---|
| 6,411,806 B1 | 6/2002 | Garner et al. | |
| 6,591,084 B1 | 7/2003 | Chuprun et al. | |
| 9,455,777 B1 | 9/2016 | Johnson et al. | |
| 9,622,259 B2 | 4/2017 | Johnson et al. | |
| 2009/0323607 A1 | 12/2009 | Park et al. | |
| 2012/0188961 A1* | 7/2012 | Suzuki | H04W 74/0833 370/329 |
| 2012/0307717 A1 | 12/2012 | Worrall et al. | |

(Continued)

FOREIGN PATENT DOCUMENTS

WO    WO 2017/219148    12/2017

OTHER PUBLICATIONS

Notification of Transmittal of the International Search Report and the Written Opinion of the International Searching Authority, or the Declaration, PCT/US20/55178, dated Jan. 8, 2020.

*Primary Examiner* — Candal Elpenord
(74) *Attorney, Agent, or Firm* — Brian R. Short

(57) ABSTRACT

Apparatuses, methods, and systems for data source reporting are disclosed. A method includes receiving, by a base station, one or more preambles from a set of one or more data sources during a scheduled time slot, receiving, by the base station, one or more virtual preambles from a network server during the scheduled time slot, wherein the one or more virtual preambles are associated with another set of one or more data sources, generating, by the base station, responses to the preambles and the virtual preambles, wherein the responses included scheduled time and frequency allocations for uplink communication from the set of one or more data sources and the other set of one or more data sources, and transmitting, by the base station, the responses to the set of one or more data sources and the other set of one or more data sources.

20 Claims, 8 Drawing Sheets

(56) References Cited

U.S. PATENT DOCUMENTS

| | | |
|---|---|---|
| 2014/0036820 A1 | 2/2014 | McNamara et al. |
| 2014/0181288 A1 | 6/2014 | Potkonjak |
| 2015/0057011 A1* | 2/2015 | Di Girolamo ........ H04W 16/14 455/454 |
| 2015/0257170 A1 | 9/2015 | Gao |
| 2016/0125471 A1 | 5/2016 | Hsu et al. |
| 2016/0135227 A1 | 5/2016 | Hahn et al. |
| 2016/0143059 A1* | 5/2016 | Jha .................... H04W 74/0833 370/329 |
| 2016/0294530 A1* | 10/2016 | Merlin .................... H04L 47/12 |
| 2017/0135132 A1* | 5/2017 | Selvaganapathy .......................... H04W 56/0005 |
| 2017/0230999 A1 | 8/2017 | Zeira et al. |
| 2017/0367113 A1 | 12/2017 | Huang et al. |

* cited by examiner

Synchronization of Data Source/Hub with
Network Server

First Turn on and Provisioning (Infrequent)

Hub Connects to Satellite
510

Download Hub Profile
520

Connect to Base Station Flow (Frequent)

Hub Connects to Satellite
530

Share Hub Profile with Data Device(s)
540

Request Synchronization Parameters
550

Figure 5

SCHEDULING VIRTUAL PREAMBLES FOR DATA SOURCE REPORTING

FIELD OF THE DESCRIBED EMBODIMENTS

The described embodiments relate generally to wireless communications. More particularly, the described embodiments relate to systems, methods and apparatuses for scheduling virtual preambles for data reporting of one or more data sources.

BACKGROUND

Current data networks are designed primarily for human users and the network and traffic characteristics that human users generate. The growth and proliferation of low-cost embedded wireless sensors and devices pose a new challenge of high volumes of low bandwidth devices vying for access to limited network resources. One of the primary challenges with these new traffic characteristics is the efficiency at which the shared network resources can be used. For common low bandwidth applications such a GPS tracking, the efficiency (useful/useless data ratio) can often be below 10%. This inefficiency is the result of large volumes of devices communicating in an uncoordinated environment. Addressing this problem is fundamental to the future commercial viability of large-scale sensor network deployments.

It is desirable to have methods, apparatuses, and systems for scheduling virtual preambles for data reporting of one or more data sources.

SUMMARY

An embodiment includes a method of data source reporting. The method includes receiving, by a base station, one or more preambles from a set of one or more data sources during a scheduled time slot, receiving, by the base station, one or more virtual preambles from a network server during the scheduled time slot, wherein the one or more virtual preambles are associated with another set of one or more data sources, generating, by the base station, responses to the preambles and the virtual preambles, wherein the responses include scheduled time and frequency allocations for uplink communication from the set of one or more data sources and the other set of one or more data sources, and transmitting, by the base station, the responses to the set of one or more data sources and the other set of one or more data sources.

Another embodiment includes a data reporting system. The system includes one or more data sources, a network server, and a base station. The base station operates to receive one or more preambles from a set of one or more data sources during a scheduled time slot, receive one or more virtual preambles from a network server during the scheduled time slot, wherein the one or more virtual preambles are associated with another set of one or more data sources, generate responses to the preambles and the virtual preambles, wherein the responses include scheduled time and frequency allocations for uplink communication from the set of one or more data sources and the other set of one or more data sources, transmits the responses to the one or more hubs and the one or more other hubs, and receive uplink wireless communication from the one or more other hubs according to the scheduled time and frequency allocations.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 5 some processes in which a hub connects to a satellite, according to an embodiment.

DETAILED DESCRIPTION

The embodiments described include methods, apparatuses, and systems for reporting data of data sources. For at least some embodiments, a base station receives one or more preambles from a set data sources during a scheduled time slot and receives one or more virtual preambles from a network server during the scheduled time slot, wherein the one or more virtual preambles are associated with another set data sources. In response to receiving the preambles and the virtual preambles, the base station generates responses which are transmitted to the data sources, wherein the responses include scheduled time and frequency allocations for uplink communication from the data sources. Once generated, the responses are transmitted by the base station to the data sources. For an embodiment, the base station generates an acknowledgement to a virtual preamble which is sent to the network server.

Figure 1:
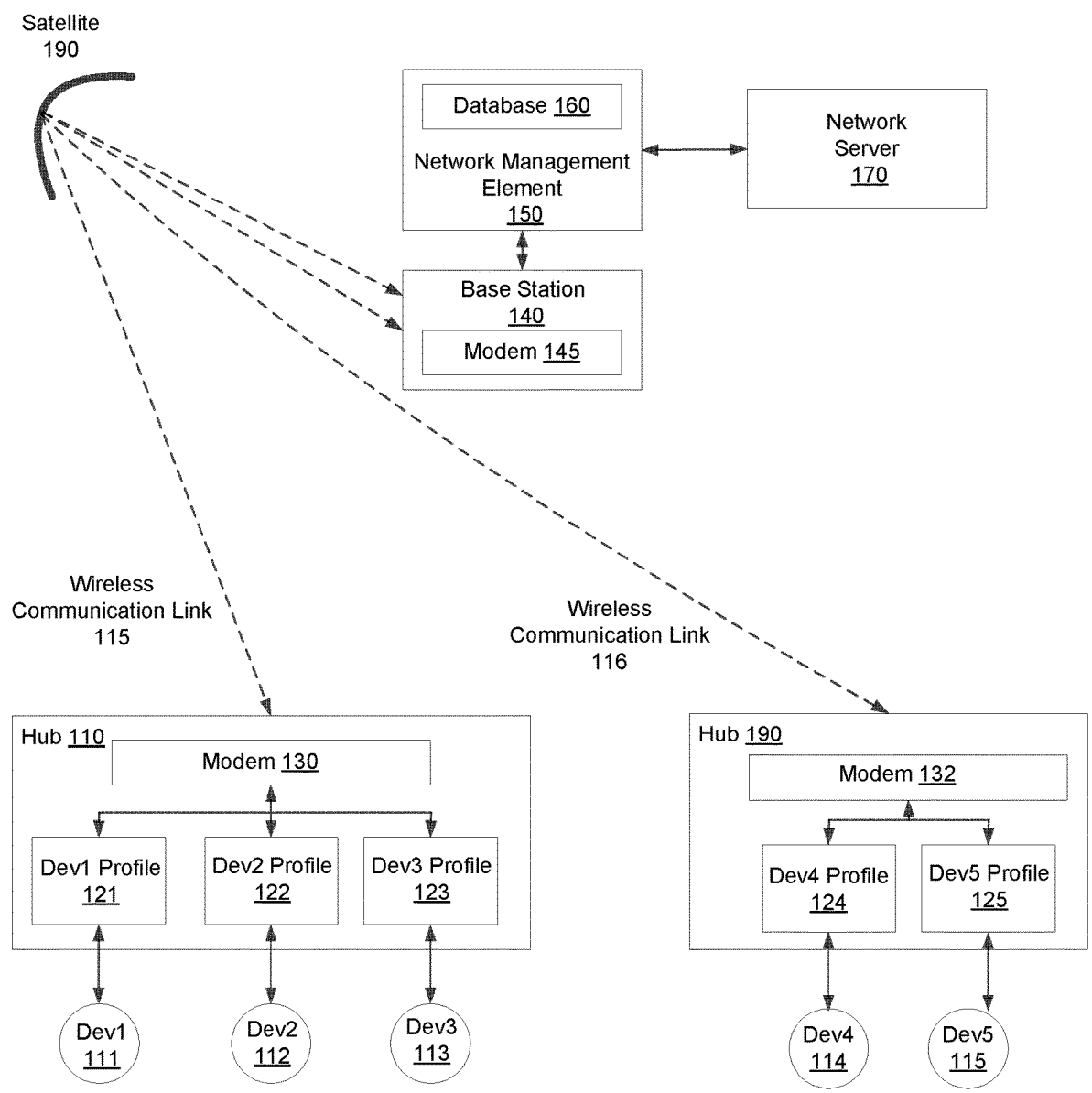
FIG. 1 shows a plurality of hubs that communicate data of data sources through a satellite link to a base station, according to an embodiment.

FIG. 1 shows a plurality of hubs 110 190 that communicate data of data sources through a satellite link to a base station 140, according to an embodiment. For an embodiment, a network provider server 170 operates to generate scheduling of the wireless communication between the base station 140 and the plurality of hubs 110, 190 through wireless links 115, 116. For an embodiment, the network provider server 170 may access a database 160 of, for example, a network management element 150, aid in generating the schedule communication, and provide the scheduled communication to the base station 140. For an embodiment, the scheduled communication includes allocating frequency and time slots for both uplink and downlink wireless communication. For an embodiment, the base station 140 includes a modem 145 and the hubs 110, 190 include modems 130, 132, for enabling the wireless communication between the base station 140 and the hubs 110, 190.

For an embodiment, the hubs 115, 116 generate a preamble when the hubs 115, 116 have data for uplink transmission to the base station 140. The preamble is transmitted through the wireless communication links 115, 116 to the base station 150. The transmission of multiple preambles is according to the schedule that specifies at least time and/or frequency slots. The base station 150 then generates a response that includes frequency and time slot for transmission of uplink data, and unique preamble Id(s) (identification) for each of the preambles and each of the virtual preambles. For an embodiment, the base station 150 generates a response that includes frequency and time slot for transmission of uplink data, unique preamble Id(s) (identification) for each of the preambles and each of the virtual preambles, and scrambling codes. The hubs 110, 116 then transmit the data to the base station.

The preambles are used to notify the base station of the need of an edge device (data device) to transmit data of the shared wireless communication links 115, 116. For at least some embodiments, the preambles are temporally coordinated (scheduled) to eliminate collisions (wireless interference) during preamble windows (scheduled time slots).

It is to be understood that an optimal network design may not utilize scheduling of preamble. However, for operation within existing standards, the preambles and virtual preambles of the described embodiments are schedule to allow operation within an existing frame work. In the existing system, preambles can be transmitted in any of the random access slots using any of the available preambles. However, through scheduling of the preambles, it is transmitted during specific random access slots controlled by the trigger function. In addition to that the trigger function can also define a preamble group from which the preamble can be chosen for transmission.

For at least some embodiments, the preambles include identifying information which correspond to a resource size allocation of the scheduling of transmissions through the shared wireless communication links 115, 116. For at least some of the described embodiments, preambles are communicated to the base station 150 over orthogonal frequencies over the air, whereas the virtual preambles are communicated to the base station 150 from the network server through an electronic network. For at least some embodiments, the virtual preambles include the same information as the over-the-air preambles.

For at least some embodiments, the virtual preamble are provided to the base station 150 temporally coordinated with the coordinated (scheduled) transmission of the preambles. That is, the virtual preambles are communicated to the base station from the network server during the same preamble window as the preambles are wirelessly communicated from the hubs 110, 190 to the base station. Essentially, the base station is "spoofed" into treating the preambles and the virtual preamble the same way. The virtual preambles need to be provided to the base station 150 using the same timing as the preambles. An external application operating on, for example, the network server 170 operates to ensure the timing of the virtual preambles is correct. For an embodiment, the network server provides the virtual preambles to the base station prior to the scheduled slot along with the timing information which allows the base station to interpret the virtual preamble at the time of scheduled slot. That is, the virtual preamble is provided to the base station before the schedule time slot, but the base station is provided with additional timing information that allows the base station to interpret the virtual preamble at the time of scheduled slot.

It is to be understood that the preambles are transmitted "over the air" and accordingly, occupy valuable available frequency spectrum. Accordingly, the number of preambles that can be allocated may be limited to the number of subcarrier frequency resources available. However, virtual preamble are communicated to the base station electrically and do not use any frequency spectrum because they are not transmitted "over the air".

For at least some embodiments, other than reception of a virtual preamble rather than a preamble, the interactions between the base station and the hub are the same for both preamble and virtual preambles. For at least some embodiments, the base station responds back to the network server upon the reception of a virtual preamble—in acknowledgement of reception of the virtual preamble.

For at least some embodiments, the implementation and use of the virtual preamble reduces the data traffic through the shared wireless communication links 115, 116 because the virtual preambles are not communicated to the base station 150 through the shared wireless communication links 115, 116. This is particularly beneficial when a large number of data devices are reporting data through the shared wireless communication links 115, 116 to the base station 150. The utilization of virtual preamble reduces the number of preambles transmitted, and accordingly, reduces network overhead. The use of virtual preamble reduces the number of preambles transmitted, and accordingly, allows more frequency spectrum to be utilized communicating data.

For an embodiment, the network server 170 generates a data profile (or hub profile) (121, 122, 123, 124, 125) for each of the hubs 110, 190. For example, the server 170 generates the data profile that the base station 140 provides to the hub 190. For an embodiment, the data profile includes a periodicity, an offset (timing offset), and a carrier frequency based on the scheduled communication. For an embodiment, the hub utilizes the periodicity, the offset, and the carrier frequency of its data profile for determining when and at what carrier frequency to transmit uplink wireless communication to the base station 140. For at least some embodiments, the data profile includes virtual preamble ID. For at least some embodiments, the data profile includes preamble IDs. For at least some embodiments, the preamble IDs includes preamble ID groups, wherein an ID group includes multiple usable IDs for the hub.

For example, the data profile may specify a periodic data transmission once very 5 minutes, with an offset, which may be represented in the data profile as: 5.05/5.03. Alternatively, periodicity can be defined in terms of a prach (physical random access channel) window. For an embodiment, a prach window is a time slot reserved for either a preamble or a virtual preamble. For an embodiment, a number of prach windows may be timing between two consecutive triggers. The offset can be defined as first prach index in a NBIOT (narrow band, internet of thing) hyperframe cycle.

For an embodiment, the base station 140 then receives uplink wireless communication from each of the plurality of hubs 110, 190 according to the data profile of each of the hubs 110, 190 and according to the scheduled communication. For an embodiment, the hubs 110, 190 use the data profiles 122, 124 for determining when to transmit, and the base station 140 uses the scheduled communication to determine when to receive the uplink wireless communication.

As shown, for an embodiment, the uplink wireless communication is transmitted by plurality of hubs and received by the base station through a satellite wireless link via a satellite 191. As described, for at least some embodiments, the hub includes the data source.

Figure 2:
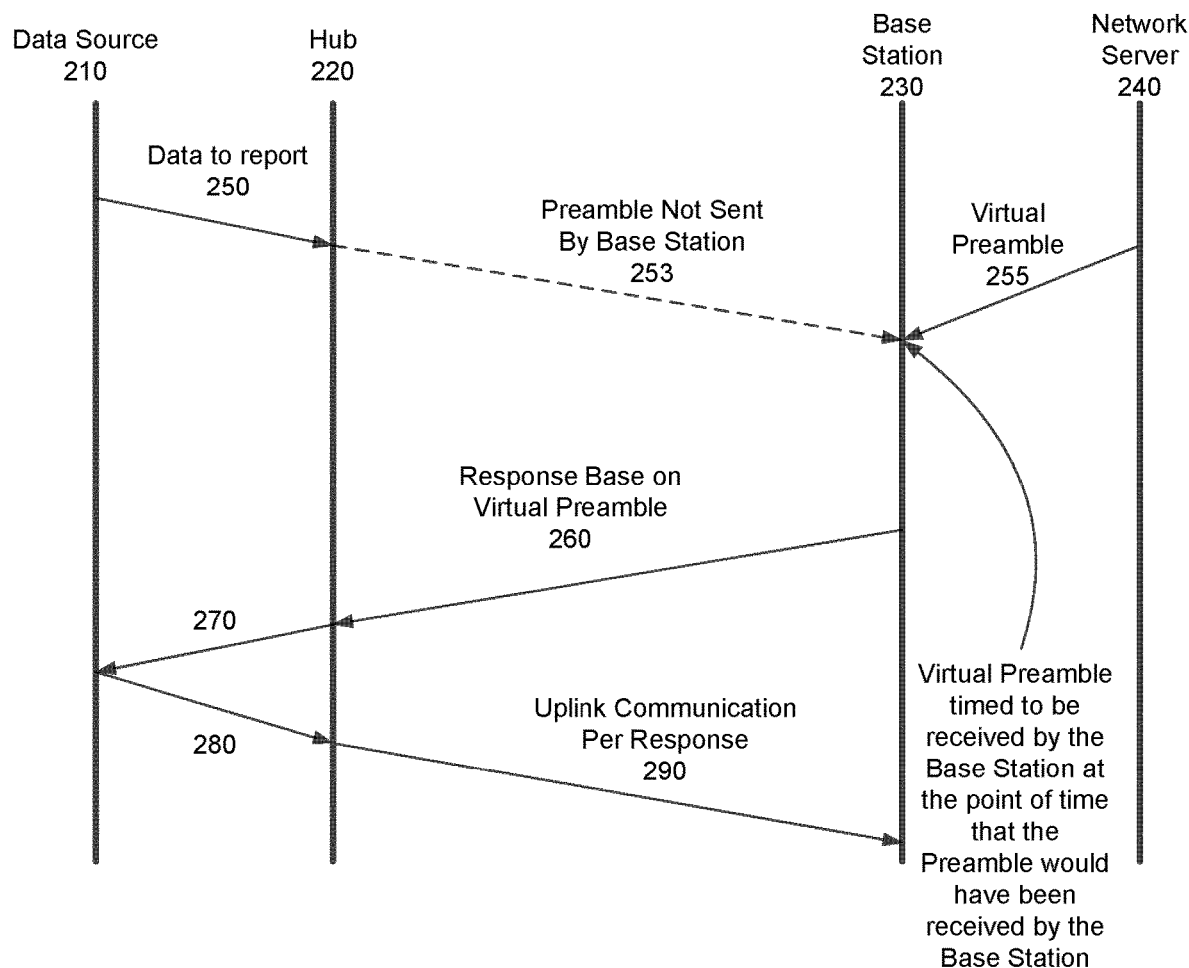
FIG. 2 shows a time-line of interactions between a data source, a hub, a base station and a network server, according to an embodiment.

FIG. 2 shows a time-line of interactions between a data source, a hub, a base station and a network server, according to an embodiment. As shown, a data source 210 reports data 250 to a hub 220. An embodiment includes hubs transmitting coordinated preambles to the base station. However, at least some embodiments further include a virtual preamble 255 being communicated by a network server 240 to the base station 230. As shown, when the virtual preamble 255 is communicated to the base station 230, an over-the-air preamble is not wirelessly transmitted (as depicted by 253) through a wireless link to the base station 230.

Once the base station 230 has received an over-the-air wirelessly transmitted preamble or has received a virtual preamble 255 from the network server 240, the base station transmits a response 260 to the virtual preamble, and to any wirelessly received preambles. The response(s) include frequency and time slot for transmission of uplink data, and unique preamble Id(s) (identification) for each of the preambles and each of the virtual preambles. For an embodiment, the responses include frequency and time slot for transmission of uplink data, unique preamble Id(s) (identification) for each of the preambles and each of the virtual preambles, and scrambling codes.

The response 260 is then communicated 270 to the data source. The data source provides 280 data to the hub 220, which then wirelessly transmits the data through uplink communication 290 per the response 260 received from the base station 230.

Figure 3:
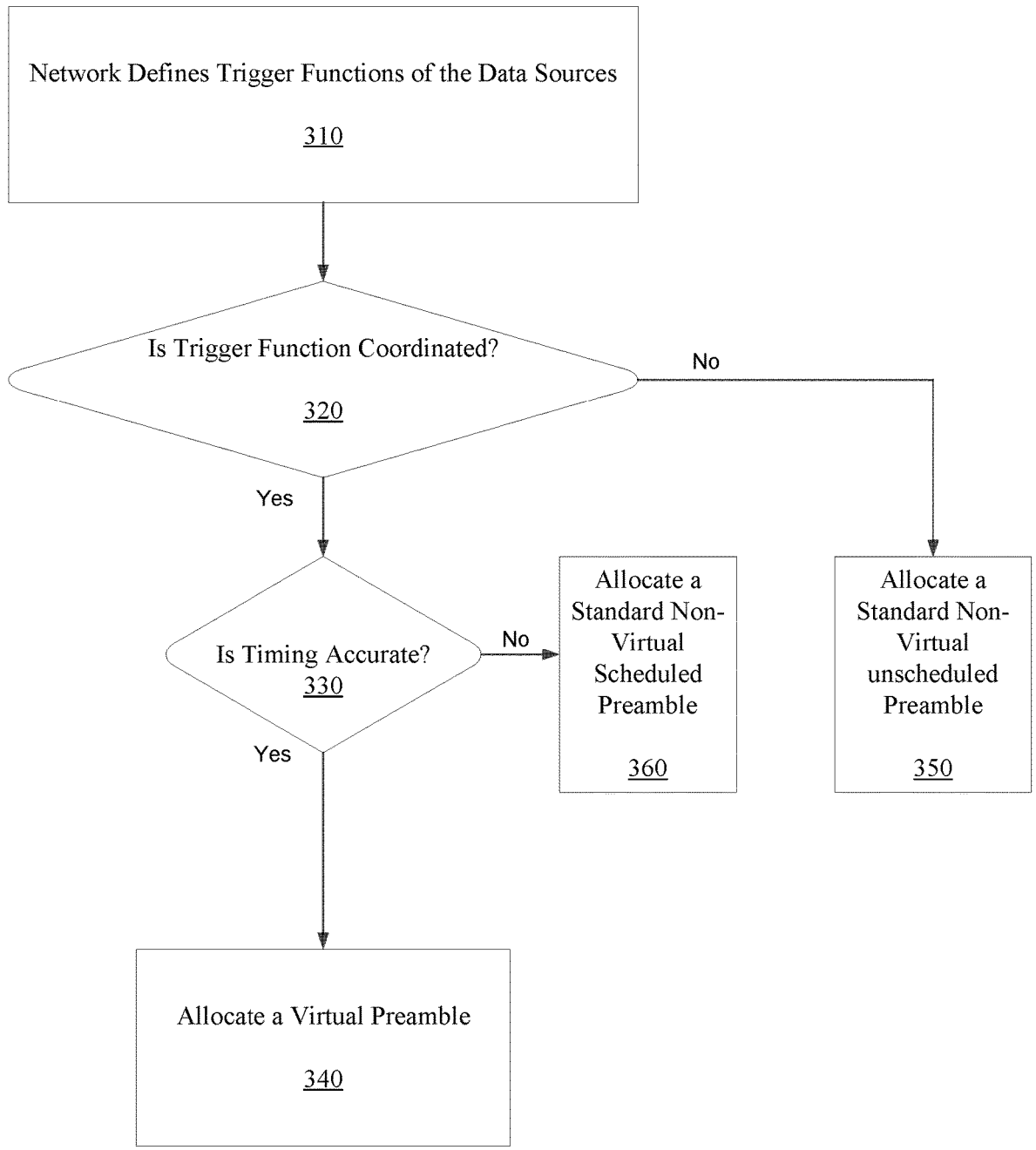
FIG. 3 is a flow chart that includes steps of a method of allocating determining whether to allocate virtual preambles for data reporting, according to an embodiment.

FIG. 3 is a flow chart that includes steps of a method of allocating determining whether to allocate virtual preambles for data reporting, according to an embodiment. An important element of communication 255 of the virtual preambles from the network server 240 to the base station 230 is that the timing of the communication of the virtual preambles needs to be according to the scheduled communication of the preambles—so that the base station can operate to respond the same to both the preambles and the virtual preambles.

For at least some embodiments, the virtual preambles are used if a timing advance measurement is not required from the base station. For an embodiment, this is possible only when hub knows the propagation delay between hub and base station within a required accuracy.

For at least some embodiments, the data reporting is functionally controlled. Exemplary function reporting of the data of the data sources include periodic reporting, scheduled reporting, a trigger function (that includes, for example a Boolean function), and/or state change triggering. The first two (periodic reporting, scheduled reporting) are predictable and coordinated, whereas the second two (trigger function, state change triggering) are less predictable and not coordinated. That is, the first two can be temporally predicted, whereas the second two are condition driven and are not as temporally predicable.

As previously stated, the virtual preambles need to be provided to the base station within a coordinated time slot. Accordingly, an embodiment includes generating virtual preambles for data reporting by the data sources that are predictable and coordinated. As shown in FIG. 3, for an embodiment, a first step 310 includes the network (for example, the network server) defining trigger (for reporting of data) functions for the data sources. Each data source can include multiple trigger functions. For each data source, a second step 320 includes determining whether the trigger function is coordinated (for example, periodic reporting, scheduled reporting). If yes, then a third step 330 includes determining if the timing between the hub and the base station, and the timing between the network server and the base station are accurate. If yes, then a fourth step 340 includes allocating a virtual preamble for the data reporting per the coordinated trigger function. That is, the reporting is temporally predicable, and generation and communicating of the virtual preamble from the network server to the base station can be performed within an allocated time slot. For this embodiment, the virtual preamble can arrive at the same time as preamble would at the base station. The network server should coordinate with the base station to inject the virtual preamble to the correct slot.

For an embodiment, the third step 330 that includes determining if the timing between the hub and the base station, and the timing between the network server and the base station are accurate, include characterizing timing synchronization performance. For an embodiment, the timing synchronization performance includes determining a wireless uplink timing synchronization accuracy between the hub and the base station. If timing synchronization performance is better than a threshold then virtual preamble can be allocated, and if it is worse than the threshold, than preambles are allocated. In order to support virtual preambles, uplink timing synchronization should be such that a "timing advance command" message is not required from the base station. For an embodiment, the base station estimates an uplink timing error and sends it to hub as a timing advance. The hub uses timing advance to correct its uplink transmission timing for further uplink transmissions. In case of virtual preambles, since there is no over the air virtual preamble, the timing error is not estimated by base station. Thus, in order to support virtual preambles, uplink timing synchronization accuracy should be better than the defined threshold. The timing accuracy performance depends upon the capability of the hub to track satellite position and/or measure accurate round trip time of wireless communication between hub and base station through the satellite. That is, for an embodiment, the timing synchronization performance can be determined by measuring the round trip time between the hub and the base station.

If the trigger function of the data to be reported is not coordinated, a fifth step 350 includes allocating a standard non-virtual unscheduled preamble for reporting of the data. That is, the non-coordinated data reporting is not predictable, and therefore, must be reported by the hub to the base station utilizing a standard non-virtual unscheduled preamble.

If the trigger function is coordinated, by the time is not accurate, a sixth step 360 includes allocating a standard non-virtual scheduled preamble for the reporting.

Figure 4:
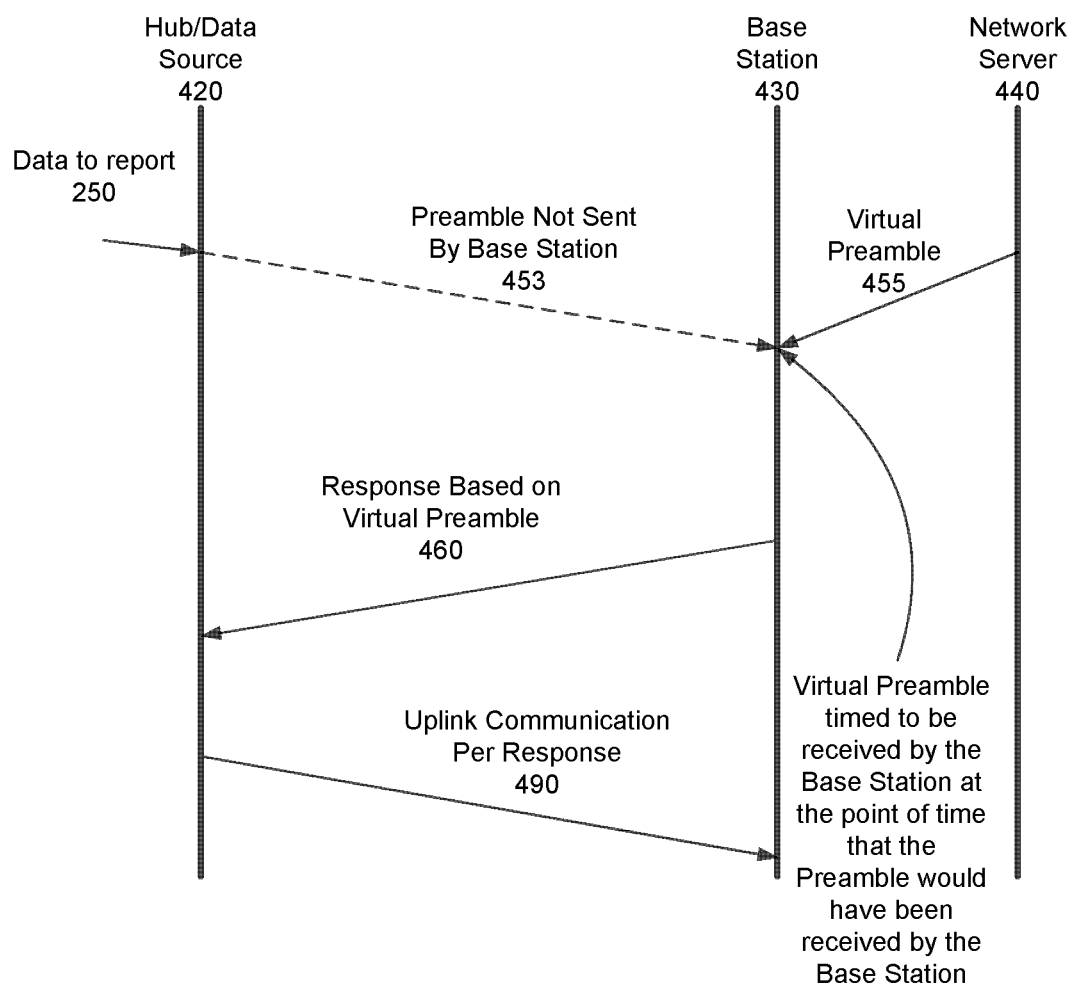
FIG. 4 shows a time-line of interactions between a hub that includes a data source, a base station and a network server, according to an embodiment.

FIG. 4 shows a time-line of interactions between a hub that includes a data source, a base station and a network server, according to an embodiment. This time-line accounts for an embodiment in which the hub 420 includes the data source. Accordingly, the hub 420 can transmit preambles (not shown) or the network server 440 can communicate virtual preamble 455 to the base station 430 and the preamble 453 is not sent by the hub 420. Either way, the base station transmits a response 460 to the hub upon receiving a preamble or a virtual preamble. The hub 420 then transmits uplink communication 490 to the base station 430 according to the information within the response 460.

FIG. 5 some processes in which a hub connects to a satellite, according to an embodiment. In a first scenario, such as, upon initially powering up the hub and provisioning the hub, a first step 510 includes the hub connecting, for example, to the satellite. Upon connecting, a second step includes downloading a hub or data profile to the hub. In a second more frequently occurring scenario, a third step 530 includes the hub connecting, for example, to the satellite. A fourth step 540 includes sharing the hub profile to, for example, data devices associated with the hub. A fifth step 550 includes requesting synchronization parameters which can be used for virtual preamble allocation and usage as shown in step 330.

Figure 6:
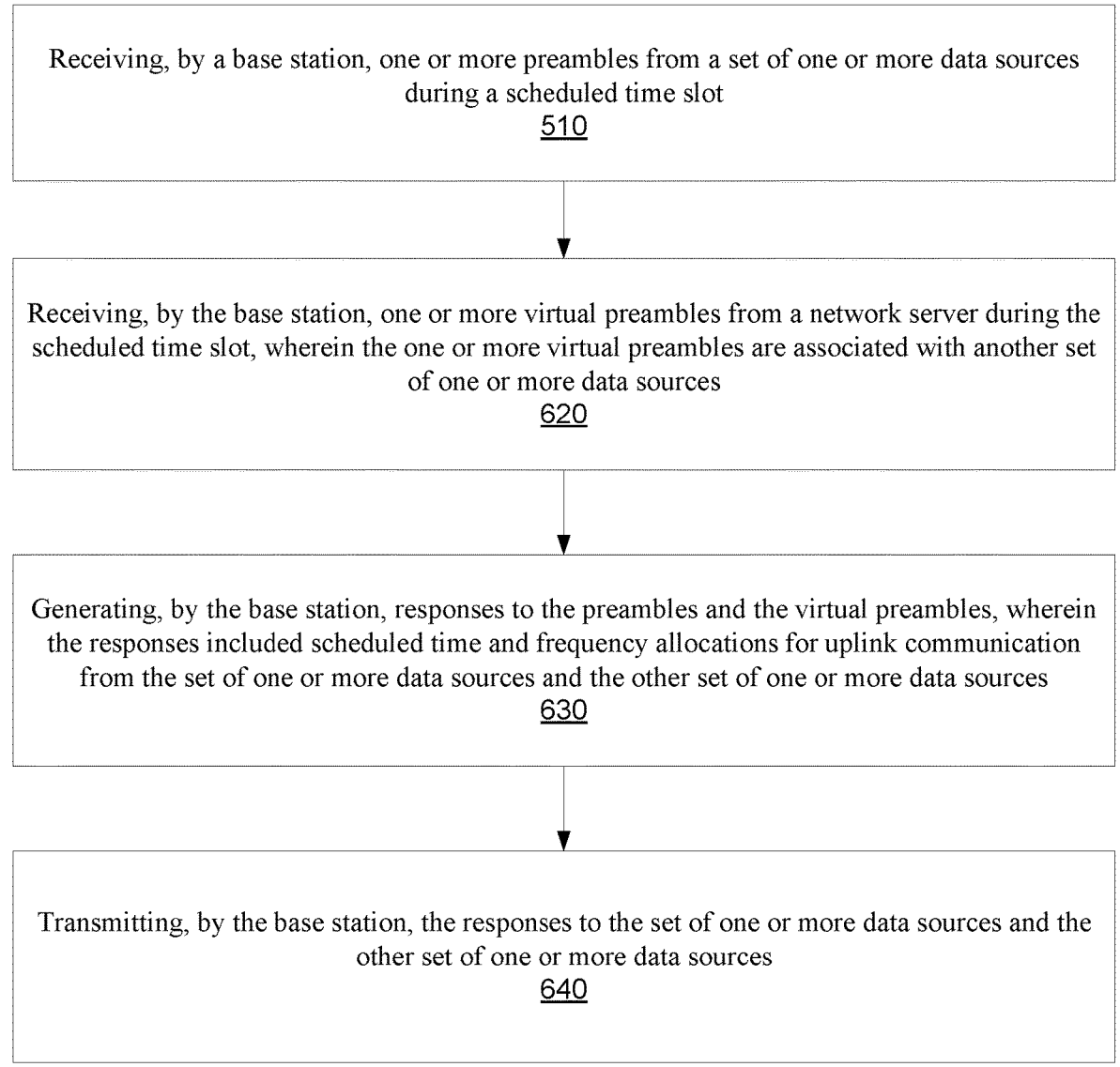
FIG. 6 is a flow chart that includes steps of a method of data reporting, according to an embodiment.

FIG. 6 is a flow chart that includes steps of a method of data reporting, according to an embodiment. A first step 610 includes receiving, by a base station, one or more preambles from a set of one or more data sources during a scheduled time slot. A second step 520 includes receiving, by the base station, one or more virtual preambles from a network server during the scheduled time slot, wherein the one or more virtual preambles are associated with another set of one or more data sources. A third step 630 includes generating, by the base station, responses to the preambles and the virtual preambles, wherein the responses included scheduled time and frequency allocations for uplink communication from the set of one or more data sources and the other set of one or more data sources. A fourth step 640 includes transmitting, by the base station, the responses to the set of one or more data sources and the other set of one or more data sources.

After the base station responds to the preambles and the virtual preambles, the base station receives uplink wireless communication from the set of one or more data sources and the other set of one or more data sources according to the scheduled time and frequency allocations.

For at least some embodiments, the slots (for example, time slots of a schedule) for the preambles and virtual preambles are pre-allocated by a network of the base station to different data sources based on data transmission requirements of the different data sources. For an embodiment, the hubs of the data sources share timing synchronization performance with the base station and base station shares the timing synchronization performance with the network server, and wherein the network server further allocates the slots for the preambles and virtual preambles based on the timing synchronization performance.

As previously described, for an embodiment, the timing synchronization performance includes a wireless uplink timing synchronization accuracy between the hub and the base station. If timing synchronization performance is better than a threshold then virtual preamble can be allocated, and if it is worse than the threshold, than preambles are allocated. In order to support virtual preambles, uplink timing synchronization should be such that a "timing advance command" message is not required from the base station. For an embodiment, the base station estimates an uplink timing error and sends it to hub as a timing advance. The hub uses timing advance to correct its uplink transmission timing for further uplink transmissions. In case of virtual preambles, since there is no over the air virtual preamble, the timing error is not estimated by base station. Thus, in order to support virtual preambles, uplink timing synchronization accuracy should be better than the defined threshold. The timing accuracy performance depends upon the capability of the hub to track satellite position and/or measure accurate round trip time of wireless communication between hub and base station through the satellite. That is, for an embodiment, the timing synchronization performance can be determined by measuring the round trip time between the hub and the base station.

For an embodiment, the network server defines a trigger function of the virtual preambles. For an embodiment, slots for the preambles and the virtual preambles are pre-allocated based on a level of deterministic coordination of the trigger function of the virtual preambles. For an embodiment, the one or more data sources communicates with the base station through one or more hubs, and wherein at least one of the hubs include a plurality of triggers, and preambles and virtual preambles are assigned to the at least one hub based on the plurality of triggers.

For an embodiment, the preambles and the virtual preambles provide notice to the base station that a hub associated with at least one data source needs to transmit over the uplink wireless link.

For an embodiment, the network server temporally coordinates the virtual preambles with the scheduled time slots, and the network server temporally coordinates the preambles with the scheduled time slots. For an embodiment, the network server additionally temporally coordinating the virtual preambles with a propagation air-time between the base station and a hub associated with at least one data source. For an embodiment, this includes the network server conveying to the hub scheduled time slots for both preambles and virtual preambles along with trigger functions.

Figure 7:
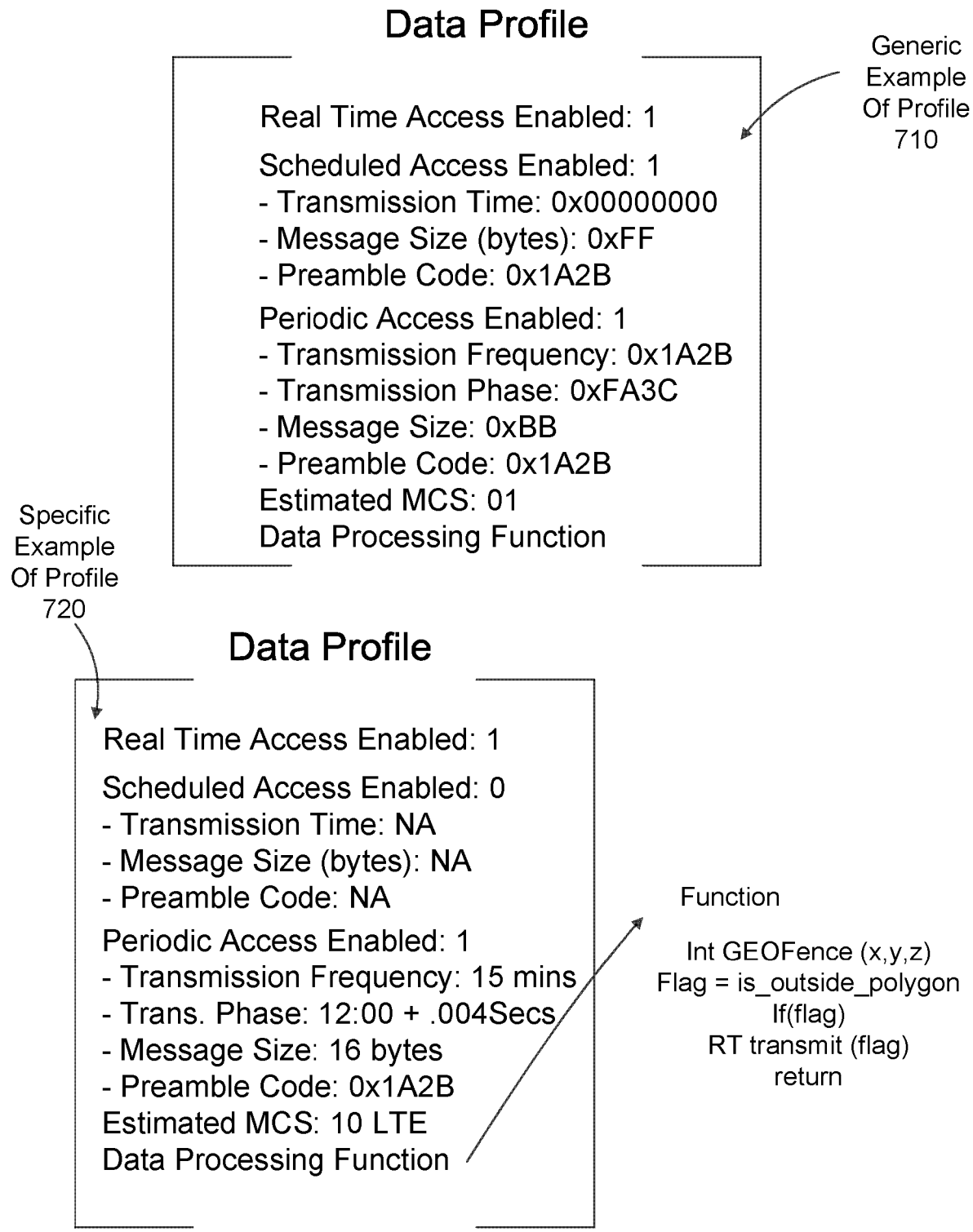
FIG. 7 shows data profiles, according to an embodiment.

For an embodiment, the responses include a preamble ID or a virtual preamble ID. For an embodiment, the responses further include a time duration in which a scrambling code is valid. For an embodiment, the scrambling code includes an RNTI (Radio Network Temporary Identifier). For an embodiment, the preambles and the virtual preambles each include identifying information, and further comprising identifying, by the base station, a resource allocation size (number of time and frequency slots) based on the identifying information FIG. 7 shows data profiles, according to an embodiment. The data profiles provide coordination of the communication of the data of the data devices over the shared wireless satellite links. The communication can include one or more of real time data reporting, scheduled data reporting, and/or periodic data reporting. The data profile for a given data device provides the hub associated with the data device the ability to control a timing of communication of the data for each of the one or more data sources from the hub to a base station through the wireless satellite link. The controlled timing provides for synchronization of the communication of the data with respect to the communication of data of other data source of both the same hub, and for one or more different hubs. For an embodiment, the data profile additionally provides the hub with a frequency allocation for the communication of the data of the data source.

An exemplary generic data profile 710 of FIG. 7 includes enablement of real time access or real time reporting of the data of the data device, enablement of scheduled access or scheduled reporting of the data of the data device, and enablement of periodic access or periodic reporting of the data of the data device. Further, for an embodiment, the data profile also includes an estimated MCS (modulation and coding scheme). Further, for an embodiment, the data profile also includes a data processing function.

A specific example of a data profile 720 provides for reporting of the location of a data device. This could be, for example, the reporting of data of a data device associated with a vehicle. For this embodiment, both the real time data reporting and the periodic data reporting are enabled, but the scheduled reporting is not enabled. Specifically, the periodic reporting is specified to report once every 15 minutes, beginning and 12:00 (noon). Further, the reporting packet includes a message size of 16 bytes, wherein the preamble codes and the MCS are specified. The data profile 720 includes a specific data processing function. The exemplary function includes determining whether the data device (and therefore, the vehicle associated with the data device) is within a geographical fence. While the data device is within the geographical fence, the data device follows the periodic reporting schedule as specified by the data profile. If the data device is detected to leave an area specified by the geographical fence, the real time reporting flag is triggered, and the hub of the data device performed real time communication with the base station that includes, for example, the location of the data device as detected outside of the geographical fence.

Figure 8:
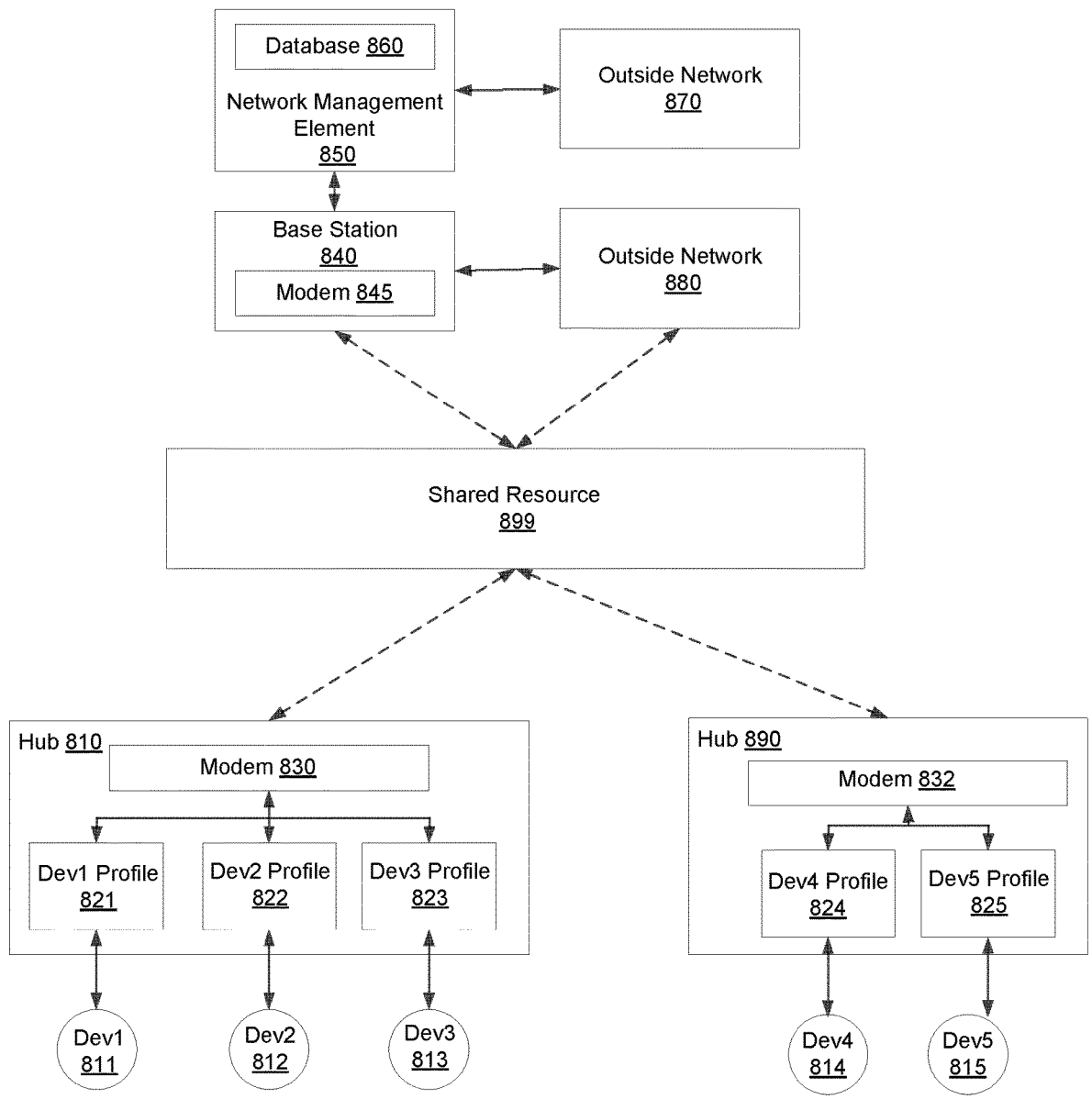
FIG. 8 shows a plurality of hubs that communicate data of data sources through a shared resource to a base station, according to an embodiment.

FIG. 8 shows a plurality of hubs 810, 890 that communicate data of data sources 811, 812, 813, 814, 815 through a shared resource to a base station, according to an embodiment. As shown, the data sources 811, 812, 813, 814, 815 are connected to the hubs 810, 890. The hubs 810, 890 communicate through modems 830, 832 to a modem 845 of the base station 840 through the wireless links. For an embodiment, the wireless links are a shared resource 899 that has a limited capacity. The described embodiments include data profiles which are utilized to provide efficient use of the shared resource 899. The base station may also communicate with outside networks 870, 880.

As previously described, it is to be understood that the data sources 811, 812, 813, 814, 815 can vary in type, and can each require very different data reporting characteristics. The shared resource 899 is a limited resource, and the use of this limited resource should be judicious and efficient. In order to efficiently utilize the shared resource 899, each of the data sources 811, 812, 813, 814, 815 are provided with data profiles 821, 822, 823, 824, 825 that coordinate the timing (and/or frequency) of reporting (communication by the hubs 810, 890 to the base station 840 through the shared resource 899) of the data provided by the data sources 811, 812, 813, 814, 815.

For an embodiment, a network management element 850 maintains a database 860 in which the data profiles 821, 822, 823, 824, 825 can be stored and maintained. Further, the network management element 850 manages the data profiles 821, 822, 823, 824, 825, wherein the management includes ensuring that synchronization is maintained during the data reporting by the hubs 810, 890 of the data of each of the data sources 811, 812, 813, 814, 815. That is, the data reported by each hub 810, 890 of the data of the data sources 811, 812, 813, 814, 815 maintains synchronization of the data reporting of each of the data sources 811, 812, 813, 814, 815 relative to each other. Again, the network management element 850 ensures this synchronization through management of the data profiles 821, 822, 823, 824, 825. The synchronization between the data sources 811, 812, 813, 814, 815 distributes the timing of the reporting of the data of each of the data sources 811, 812, 813, 814, 815 to prevent the reporting of one device from interfering with the reporting of another device, and provides for efficiency in the data reporting.

For at least some embodiments, the network management element 850 resides in a central network location perhaps collocated with multiple base stations and/or co-located with a network operations center (as shown, for example, in FIG. 6). For an embodiment, the network management element 850 directly communicates with the base station 840 and initiates the transfer of data profiles across the network via the base station 840 to the hubs 810, 890.

For at least some embodiments, data profiles are distributed when new hubs are brought onto the network, when hubs change ownership, or when the hubs are re-provisioned. Other changes to data profile contents outside of these situations are more likely addressed by sync packets (for an embodiment, a sync packet is a packet to update the value of a specific field inside of a data profile, but not necessarily updating the structure of the data profile) were only small changes to profile fields are required.

As described, the data profiles 821, 822, 823, 824, 825 control timing of when the hubs 810, 890 communicate the data of the data sources 811, 812, 813, 814, 815 through the shared resource 899. Accordingly, the described embodiments coordinate access to the shared resource 899 to insure optimal usage of the network resource to avoid collisions between packets, the transmission of redundant information, and to reshape undesired traffic profiles.

Although specific embodiments have been described and illustrated, the embodiments are not to be limited to the specific forms or arrangements of parts so described and illustrated. The described embodiments are to only be limited by the claims.

What is claimed:

1. A method, comprising:
receiving, by a base station, one or more preambles from a set of one or more data sources during a scheduled time slot;
receiving, by the base station, one or more virtual preambles from a network server during the scheduled time slot, wherein the one or more virtual preambles are associated with another set of one or more data sources;
generating, by the base station, responses to the preambles and the virtual preambles, wherein the responses include scheduled time and frequency allocations for uplink communication from the set of one or more data sources and the other set of one or more data sources; and
transmitting, by the base station, the responses to the set of one or more data sources and the other set of one or more data sources.

2. The method of claim 1, further comprising:
receiving, by the base station, uplink wireless communication from the set of one or more data sources and the other set of one or more data sources according to the scheduled time and frequency allocations.

3. The method of claim 1, wherein slots for the preambles and virtual preambles are pre-allocated by the network server of the base station to different data sources based on data transmission requirements of the different data sources, wherein hubs of the data sources share timing synchronization performance with the base station and base station shares the timing synchronization performance with the network server, and wherein the network server further allocates the slots for the preambles and virtual preambles based on the timing synchronization performance.

4. The method of claim 3, further comprising the network server defining a trigger function of the virtual preambles.

5. The method of claim 4, wherein slots for the preambles and the virtual preambles are pre-allocated based on a level of deterministic coordination of the trigger function of the virtual preambles.

6. The method of claim 5, wherein the one or more data source communicate with the base station through one or more hubs, and wherein at least one of the hubs include a plurality of triggers, and preambles and virtual preambles are assigned to the at least one hub based on the plurality of triggers.

7. The method of claim 1, wherein the preambles and the virtual preambles provide notice to the base station that a hub associated with at least one data source needs to transmit over the uplink wireless link.

8. The method of claim 1, further comprising the network server temporally coordinating the virtual preambles with the scheduled time slots, and the network server temporally coordinating the preambles with the scheduled time slots.

9. The method of claim 8, further comprising the network server additionally temporally coordinating the virtual preambles with a propagation air-time between the base station and a hub associated with at least one data source.

10. The method of claim 1, wherein the responses include a preamble ID or a virtual preamble ID.

11. The method of claim 10, wherein the responses further include a time duration in which a scrambling code is valid.

12. The method of claim 1, wherein the preambles and the virtual preambles each include identifying information, and further comprising identifying, by the base station, a resource allocation size (number of time and frequency slots) based on the identifying information.

13. A data reporting system, comprising:
one or more data sources; a network server; a base station operative to:
receive one or more preambles from a set of one or more data sources during a scheduled time slot;
receive one or more virtual preambles from the network server during the scheduled time slot, wherein the one or more virtual preambles are associated with another set of one or more data sources;
generate responses to the preambles and the virtual preambles, wherein the responses include scheduled time and frequency allocations for uplink communication from the set of one or more data sources and the other set of one or more data sources;
transmits the responses to the one or more hubs and the one or more other hubs; and
receive uplink wireless communication from the one or more other hubs according to the scheduled time and frequency allocations.

14. The system of claim 13, wherein slots for the preambles and virtual preambles are pre-allocated by the network server of the base station to different data sources based on data transmission requirements of the different data sources.

15. The system of claim 14, wherein the network server operates to define a trigger function of the virtual preambles.

16. The system of claim 15, wherein slots for the preambles and the virtual preambles are pre-allocated based on a level of deterministic coordination of the trigger function of the virtual preambles.

17. The system of claim 16, wherein the one or more data source communicate with the base station through one or more hubs, and wherein at least one of the hub include a plurality of triggers, and preambles and virtual preambles are assigned to the at least one hub based on the plurality of triggers.

18. The system of claim 13, wherein the network server further operates to temporally coordinate the virtual preambles with the scheduled time slots.

19. The system of claim 18, wherein the network server further operates to additionally temporally coordinate the virtual preambles with a propagation air-time between the base station and a hub associated with at least one data source.

20. The system of claim 13, wherein the responses include a preamble ID or a virtual preamble ID.

* * * * *